US011212764B2

(12) United States Patent
Nguyen et al.

(10) Patent No.: US 11,212,764 B2
(45) Date of Patent: Dec. 28, 2021

(54) TIMING ACCURACY CONTROL FOR VEHICLE-TO-EVERYTHING (V2X) SIDELINK TRANSMISSION

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Shailesh Patil, San Diego, CA (US); Kapil Gulati, Hillsborough, NJ (US); Naga Bhushan, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/565,373

(22) Filed: Sep. 9, 2019

(65) Prior Publication Data
US 2020/0107284 A1 Apr. 2, 2020

Related U.S. Application Data

(60) Provisional application No. 62/738,911, filed on Sep. 28, 2018.

(51) Int. Cl.
*H04W 56/00* (2009.01)
*H04W 4/40* (2018.01)
(Continued)

(52) U.S. Cl.
CPC ......... *H04W 56/0045* (2013.01); *H04W 4/40* (2018.02); *H04W 52/283* (2013.01); *H04W 52/383* (2013.01); *H04W 92/18* (2013.01)

(58) Field of Classification Search
CPC . H04W 56/0045; H04W 4/40; H04W 52/283; H04W 52/383; H04W 92/18
(Continued)

(56) References Cited

U.S. PATENT DOCUMENTS

2019/0037513 A1* 1/2019 Yang ..................... G01S 19/24
2019/0037622 A1* 1/2019 Blasco Serrano .... H04W 76/14
(Continued)

OTHER PUBLICATIONS

"3rd Generation Partnership Project; Technical Specification Group Radio Access Network; Evolved Universal Terrestrial Radio Access (E-UTRA); Requirements for Support of Radio Resource Management (Release 15)", 3GPP Standard; Technical Specification; 3GPP TS 36.133, 3rd Generation Partnership Project (3GPP), Mobile Competence Centre; 650, Route Des Lucioles; F-06921 Sophia-Antipolis Cedex; France, vol. RAN WG4, No. V15.3.0, Jul. 9, 2018, XP051474923, [retrieved on Jul. 9, 2018] paragraph [11.2.2] paragraph [12.2.1], pp. 685-693.

(Continued)

*Primary Examiner* — Obaidul Huq
(74) *Attorney, Agent, or Firm* — Holland & Hart LLP/Qualcomm

(57) ABSTRACT

Methods, systems, and devices for wireless communications are described. Generally, the described techniques provide for determining that synchronization for sidelink communication is based on a synchronization source type, and identifying a priority level for a sidelink transmission. The described techniques also include selecting a modified timing error requirement for the sidelink transmission based at least in part on determining that the synchronization source type is the synchronization source for sidelink communications, and the identified priority level, and sending the sidelink transmission using the modified timing error requirement. In some examples, a sidelink device may identify an MCS for sending the sidelink transmission, and
(Continued)

may select the modified timing error requirement for the sidelink transmission based on the MCS. In some examples, a sidelink device may identify a required range for a sidelink transmission, and may select the modified timing error required for the sidelink transmission based on the required range.

26 Claims, 10 Drawing Sheets

(51) Int. Cl.
*H04W 52/28* (2009.01)
*H04W 52/38* (2009.01)
*H04W 92/18* (2009.01)

(58) Field of Classification Search
USPC .......................................... 370/310, 345, 350
See application file for complete search history.

(56) References Cited

U.S. PATENT DOCUMENTS

| 2019/0090293 A1* | 3/2019 | Su ..................... H04W 56/0015 |
| 2019/0200309 A1* | 6/2019 | Zeng .................... H04W 88/023 |
| 2020/0008030 A1* | 1/2020 | Kim ........................ H04W 4/70 |

OTHER PUBLICATIONS

Intel Corporation: "LTE V2V Demodulation Requirements: Single-link Test Cases", 3GPP Draft; R4-1702920—Intel—V2V Demod Single Link, 3rd Generation Partnership Project (3GPP), Mobile Competence Centre; 650, Route Des Lucioles; F-06921 Sophia-Antipolis Cedex; France, vol. RAN WG4, No. Spokane, USA; Apr. 3, 2017-Apr. 7, 2017 Apr. 3, 2017, XP051246170, Retrieved from the Internet: URL:http://www.3gpp.org/ftp/Meetings_3GPP_SYNC/RAN4/Docs/ [retrieved on Apr. 3, 2017], p. 2, paragraph Timing error model, 9 pages.
International Search Report and Written Opinion—PCT/US2019/050358—ISA/EPO—Nov. 25, 2019.

* cited by examiner

TIMING ACCURACY CONTROL FOR VEHICLE-TO-EVERYTHING (V2X) SIDELINK TRANSMISSION

CROSS REFERENCE

The present Application for Patent claims the benefit of U.S. Provisional Patent Application No. 62/738,911 by NGUYEN, et al., entitled "TIMING ACCURACY CONTROL FOR VEHICLE-TO-EVERYTHING (V2X) SIDELINK TRANSMISSION," filed Sep. 28, 2018, assigned to the assignee hereof, and expressly incorporated herein.

BACKGROUND

The following relates generally to wireless communications, and more specifically to timing accuracy control for vehicle to everything (V2X) sidelink transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Synchronization may be a prerequisite for wireless communication in some communication systems (e.g., LTE communication systems, NR communication systems, or the like). However, in some cases, modified timing error requirements may be desirable.

SUMMARY

The described techniques relate to improved methods, systems, devices, and apparatuses that support timing accuracy control for vehicle-to-everything (V2X) sidelink transmission. Generally, the described techniques provide for determining that synchronization for sidelink communication is based on a synchronization source type (e.g., global navigation satellite system (GNSS), base station, user equipment (UE), etc.) and identifying a priority level for a sidelink transmission. The described techniques also include selecting a modified timing error requirement for the sidelink transmission based at least in part on determining that the synchronization source type is the synchronization source for sidelink communications, and the identified priority level, and sending the sidelink transmission using the modified timing error requirement. In some examples, a sidelink device may identify a modulation and coding scheme (MCS) for sending the sidelink transmission, and may select the modified timing error requirement for the sidelink transmission based on the MCS. In some examples, a sidelink device may identify a required range for a sidelink transmission, and may select the modified timing error required for the sidelink transmission based on the required range.

A method of wireless communication is described. The method may include determining that synchronization for sidelink communication is based on a synchronization source type, identifying a priority level for a sidelink transmission, selecting a modified timing error requirement for the sidelink transmission based on the determining and the identifying, and sending the sidelink transmission using the modified timing error requirement, where the synchronization source type includes at least one of a global navigation satellite system, or a base station, or a user equipment, or any combination thereof.

An apparatus for wireless communication is described. The apparatus may include a processor, memory in electronic communication with the processor, and instructions stored in the memory. The instructions may be executable by the processor to cause the apparatus to determine that synchronization for sidelink communication is based on a synchronization source type, identify a priority level for a sidelink transmission, select a modified timing error requirement for the sidelink transmission based on the determining and the identifying, and send the sidelink transmission using the modified timing error requirement.

Another apparatus for wireless communication is described. The apparatus may include means for determining that synchronization for sidelink communication is based on a synchronization source type, identifying a priority level for a sidelink transmission, selecting a modified timing error requirement for the sidelink transmission based on the determining and the identifying, and sending the sidelink transmission using the modified timing error requirement.

A non-transitory computer-readable medium storing code for wireless communication is described. The code may include instructions executable by a processor to determine that synchronization for sidelink communication is based on a synchronization source type, identify a priority level for a sidelink transmission, select a modified timing error requirement for the sidelink transmission based on the determining and the identifying, and send the sidelink transmission using the modified timing error requirement.

Some examples of the method, apparatuses, and non-transitory computer-readable medium described herein may further include operations, features, means, or instructions for identifying an MCS for transmitting the sidelink transmission, where selecting the modified timing error requirement for the sidelink transmission may be based on the identified MCS.

Some examples of the method, apparatuses, and non-transitory computer-readable medium described herein may further include operations, features, means, or instructions for applying the identified MCS to a lookup table and identifying an entry in the lookup table indicating a timing error requirement corresponding to the identified MCS, where selecting the modified timing error requirement may be based on the identified entry in the lookup table.

Some examples of the method, apparatuses, and non-transitory computer-readable medium described herein may further include operations, features, means, or instructions for determining an MCS threshold value and comparing the identified MCS to the MCS threshold value to determine whether the identified MCS exceeds the MCS threshold value, where selecting the modified timing error requirement may be based on the comparing.

Some examples of the method, apparatuses, and non-transitory computer-readable medium described herein may further include operations, features, means, or instructions for identifying the MCS may be based on the identified priority level.

Some examples of the method, apparatuses, and non-transitory computer-readable medium described herein may further include operations, features, means, or instructions for receiving an indication of one or more modified timing error requirement values from a network device, where selecting the modified timing error requirement may be based on the indication.

Some examples of the method, apparatuses, and non-transitory computer-readable medium described herein may further include operations, features, means, or instructions for identifying one or more preconfigured modified timing error requirement values, where selecting the modified timing error requirement may be based on the one or more preconfigured modified timing error requirement values.

Some examples of the method, apparatuses, and non-transitory computer-readable medium described herein may further include operations, features, means, or instructions for identifying a required range for transmitting the sidelink transmission and setting a transmission power for sending the sidelink transmission based on the identified required range, where selecting the modified timing error requirement may be based on the required range and the transmission power.

Some examples of the method, apparatuses, and non-transitory computer-readable medium described herein may further include operations, features, means, or instructions for identifying a propagation delay corresponding to the identified required range for transmitting the sidelink transmission, where setting the transmission power for sending the sidelink transmission may be based on the identified propagation delay or the modified timing error requirement, or both.

DETAILED DESCRIPTION

Figure 1:
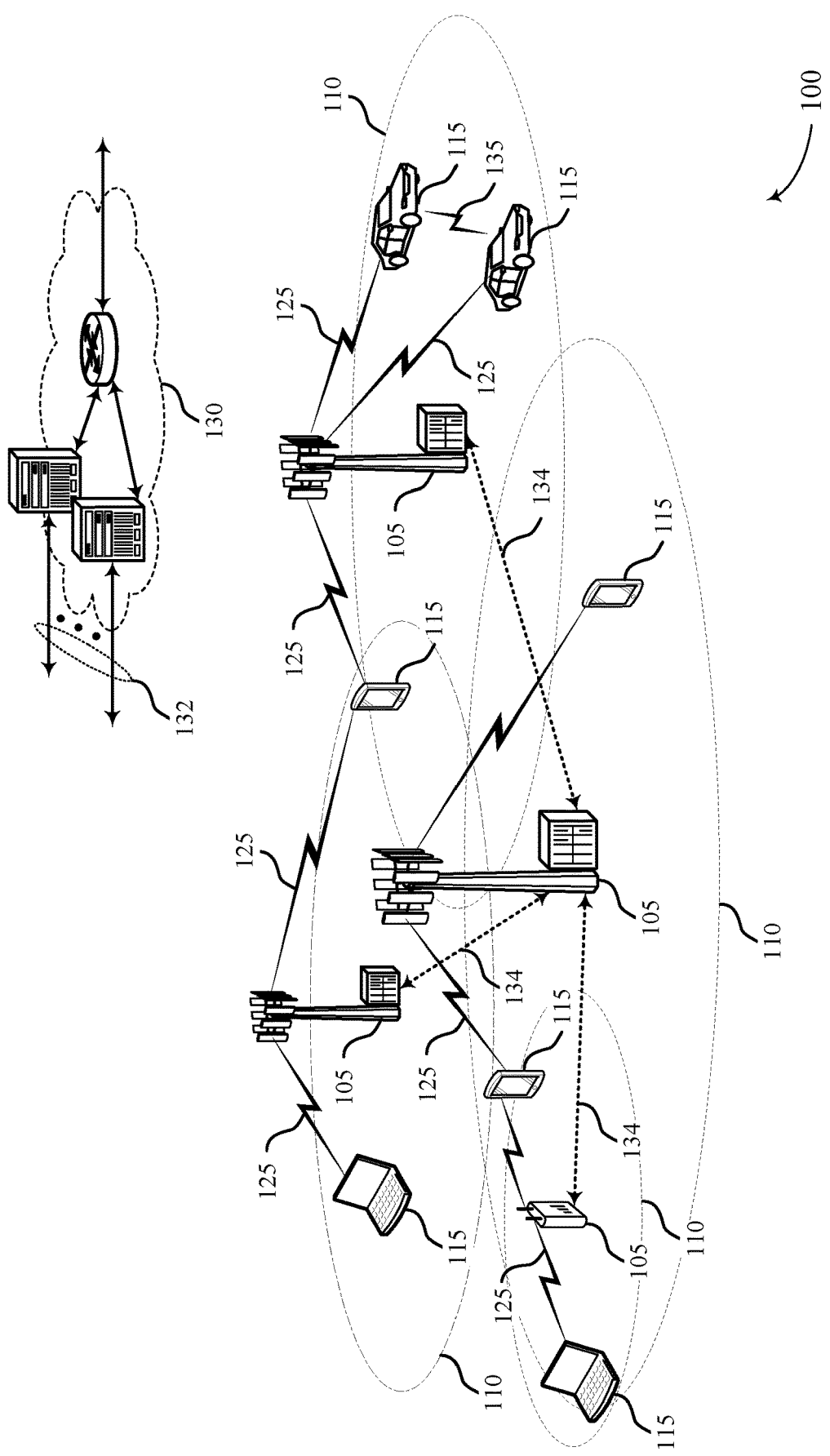
FIG. 1 illustrates an example of a system for wireless communications that supports timing accuracy control for vehicle-to-everything (V2X) sidelink transmission in accordance with aspects of the present disclosure.

Some wireless communication systems may be used to facilitate communications with various devices, which may include vehicles and these systems may sometimes be referred to as vehicle-to-everything (V2X) communication systems. V2X communication systems may be configured to convey information between vehicles in one or more unencrypted messages that may lead to potential tracking by a third party. Synchronization may be a prerequisite for wireless communication in some communication systems (e.g., Long Term Evolution (LTE) communication systems, New Radio (NR) communication systems, or the like). Synchronization may ensure that each device (e.g., all UEs in a geographic coverage area) begin and end all transmissions at or around the same time. Some types of communications may rely on legacy timing requirements associated with a timing error requirement (i.e., a maximum permitted timing error for successful communication).

In some wireless communications systems, such as distributed wireless networks, wireless devices (e.g., UEs) may directly communicate with each other (e.g., via sidelink communications) and may support various radio frequency and/or baseband capabilities. In some cases, direct communications between wireless devices may include direct communications between vehicles (e.g., sidelink UEs) and systems that use such communications may sometimes be referred to as V2X communication systems. V2X communication links may convey important information between vehicles regarding inclement weather, nearby accidents, road conditions, and/or the activities of nearby vehicles, for example. V2X communication systems may also be used by autonomous or semi-autonomous vehicles (e.g., self-driving vehicles or vehicles that provide driver assistance) and may provide extra information beyond the reach of existing vehicle's systems. Such V2X communications links may provide certain safety-related information (e.g., location, direction of travel, velocity, etc.) in unencrypted messages so that other vehicles may receive such information.

Synchronization may be a prerequisite for wireless communication in some communication systems (e.g., LTE communication systems, NR communication systems, or the like). Synchronization may ensure that each device (e.g., all UEs in a geographic coverage area) begin and end all transmissions at or around the same time. Some types of communications (e.g., V2X communications) may rely on legacy timing accuracy associated with a timing error requirement (i.e., a maximum permitted timing error for successful communication). However, in some cases, modified timing error requirements may be desirable.

In some cases, a high level of timing accuracy (e.g., a very low maximum permitted timing error requirement) may not provide significant benefits to communicating devices. For instance, in a peer-to-peer broadcast environment, no timing advance value is applied at each transmitting UE. In such cases, even though a transmission may be sent by the transmitting UE with high timing accuracy, the signal may arrive at a receiving UE at a different time (e.g., that does not comply with the timing accuracy requirements) based on propagation delay. On the other hand, some wireless communications (e.g., sidelink communications) may utilize a certain synchronization source type (e.g., global navigation satellite system (GNSS), base station, user equipment (UE), etc.) as a source for timing synchronization. In some examples, however, a device may lose a signal of the certain synchronization source type. In such examples, a device operating in a sidelink communication system may continue to track Coordinated Universal Time (UTC) after losing the signal of the certain synchronization source type. A modified (e.g., relaxed) timing error requirement may allow for a longer duration during which a UE may perform local tracking.

The selected modified timing error requirement may be selected by a UE (e.g., a vehicle, a sidelink UE) from one or more possible timing error requirements. For instance, a network device may indicate to the sidelink UE a set of timing error requirements. The set of timing error requirements may include two possible timing error requirements (e.g., a legacy timing error requirement and a relaxed timing error requirement) or may include multiple possible timing error requirements (e.g., a first timing error requirement, a second timing error requirement that is more relaxed than the first timing error requirement, a third timing error requirement that is more relaxed than the first and second timing error requirements, etc.). In some cases, the sidelink UE may be preconfigured with the set of timing error requirements. The sidelink UE may select one of the set of timing error requirements for transmission of a pending sidelink transmission.

In some examples, a transmitting device (e.g., a sidelink UE) may determine that certain conditions are met, and may select a modified (e.g., relaxed) timing error requirement for a sidelink transmissions if the conditions are met. For example, a sidelink UE (e.g., a vehicle) may determine that the certain synchronization source type (e.g., GNSS, base station, UE, etc.) is being used as a synchronization source for sidelink transmissions. The sidelink UE may further identify a priority level for a pending sidelink data transmission. For instance, the sidelink UE may determine that the pending sidelink data transmissions has a high level of priority. In such examples, the sidelink UE may select a relaxed timing error requirement, and may send the sidelink transmission using the relaxed timing error requirement.

In some examples, the sidelink UE may identify a modulation and coding scheme (MCS) for transmitting the sidelink transmission, and may select the relaxed timing error requirement based on the MCS. In some cases, the sidelink UE may identify the MCS based on the priority level of the pending sidelink transmission (e.g., an MCS for high priority transmissions may be lower than an MCS for a low priority transmission). In some examples, the sidelink UE may identify one of a set of different timing error requirements corresponding to the identified MCS (e.g., a lookup table may include different timing error requirements may correspond to different MCS values). In some examples, the sidelink UE may compare the identified MCS to a threshold MCS value, and may select a timing error requirement for the pending transmissions based on whether the identified MCS exceeds the MCS value.

In some examples, the sidelink UE may select a transmission power for the pending sidelink transmission based on the range of the pending sidelink transmission. The sidelink UE may select the relaxed timing error requirement based on the selected transmit power.

Aspects of the disclosure are initially described in the context of a wireless communications system. Aspects of the disclosure are further illustrated by and described with reference a process flow. Aspects of the disclosure are further illustrated by and described with reference to apparatus diagrams, system diagrams, and flowcharts that relate to timing accuracy control for V2X sidelink transmission.

FIG. 1 illustrates an example of a wireless communications system 100 that supports timing accuracy control for V2X sidelink transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support V2X communications between UEs 115, such as through proximity-based services (ProSe) which provide techniques for ProSe direct discovery of UEs 115 and for ProSe direct communication between UEs 115.

In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), device-to-device (D2D) protocol, or ProSe direct communications). Sidelink communication may be used for D2D media-sharing, vehicle-to-vehicle (V2V) communication, V2X communication (or cellular V2X (cV2X) communication), emergency rescue applications, etc. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. In cases where D2D or V2X communications are used, a V2X layer may provide related protocols, and in some cases may use ProSe direct communications protocols (e.g., PC5 signaling). A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A device (e.g., a UE 115) may determine that synchronization for sidelink communication is based on a certain synchronization source type (e.g., global navigation satellite system (GNSS), base station, user equipment (UE), etc.), and may identify a priority level for a sidelink transmission. The UE 115 may select a modified timing error requirement for the sidelink transmission based at least in part on determining that the certain synchronization source type is the synchronization source for sidelink communications, and the identified priority level, and may send the sidelink transmission using the modified timing error requirement. In some examples, a UE 115 may identify a MCS for sending the sidelink transmission, and may select the modified timing error requirement for the sidelink transmission based on the MCS. In some examples, a UE 115 may identify a required range for a sidelink transmission, and may select the modified timing error required for the sidelink transmission based on the required range.

Figure 2:
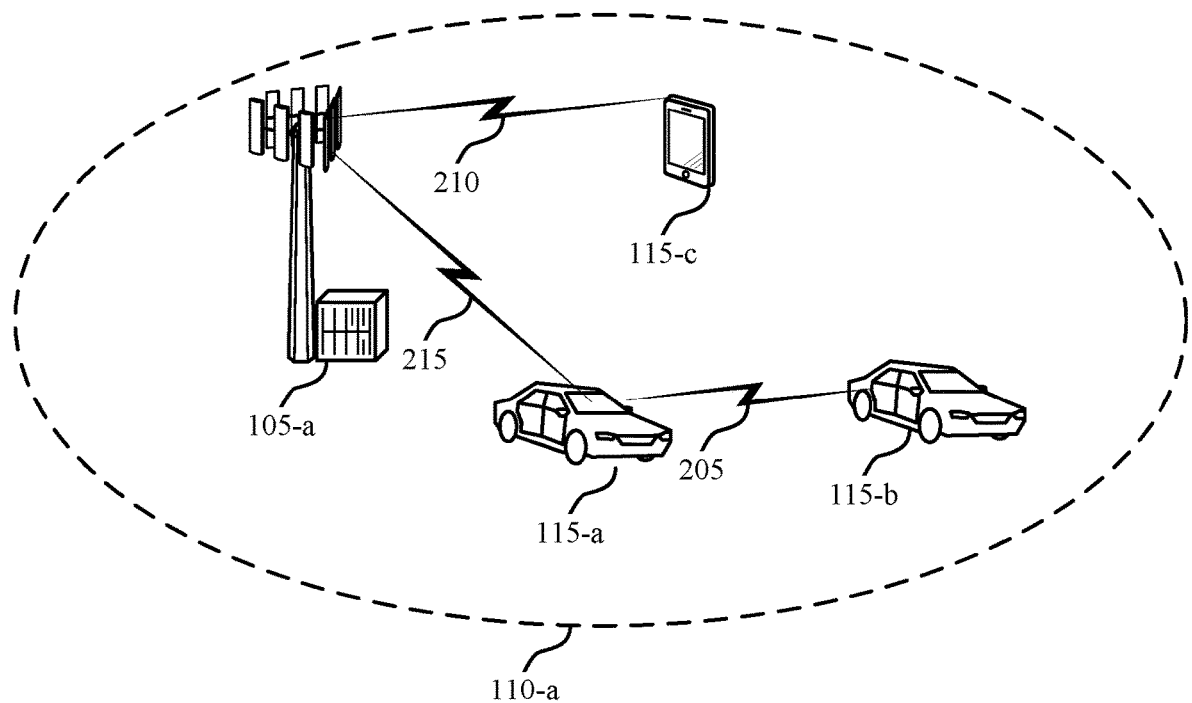
FIG. 2 illustrates an example of a wireless communications system that supports timing accuracy control for V2X sidelink transmission in accordance with aspects of the present disclosure.

FIG. 2 illustrates an example of a wireless communications system 200 that supports timing accuracy control for V2X sidelink transmission in accordance with aspects of the present disclosure. In some examples, wireless communications system 200 may implement aspects of wireless communications system 100. Wireless communications system 200 may include a base station 105-a and a UE 115-a, UE 115-b, and UE 115-c. Base station 105-a may be an example of a base station 105 in wireless communications system 100. In some cases, UEs 115 may be vehicles. In some cases, UEs 115 may be integrated with one or more vehicles (e.g., sidelink UEs). UEs 115-a and/or 115-b may be examples of UEs 115 described with reference to FIG. 1 (e.g. a phone, laptop, vehicle, etc.), and may be configured for V2X communication over one or more carriers (e.g., using ProSe direct communications). In some examples, UEs 115 may execute one or more sets of codes or sequences, to control the functional elements of the device, and perform some or all of the functions described below. In some cases, a communications manager at each UE 115 may manage V2X communications and associated IDs used in the V2X communications. While various examples described herein illustrate V2X communications using LTE or NR between UEs 115, it will be understood that techniques provided herein may be used in other communications systems that may use different radio access technologies (RATs) and communications protocols.

In some examples, a base station 105-a may communicate with one or more UEs 115 (e.g., UE 115-a and UE 115-b) via bidirectional communication link 210 and bidirectional communication link 215 in a geographic coverage area 110-a. Base station 105-a may, for example, grant resources for sidelink communication to one or more UEs 115 (e.g., UE 115-a and UE 115-b). For example, sidelink UE 115-a may perform sidelink communications on granted sidelink resources with UE 115-*b* via bidirectional communication link 205. In some examples, sidelink UE 115-*a* and sidelink UE 115-*b* may be examples of V2X UEs.

In some examples, wireless communications system 200 may support wireless communications such as LTE communications, NR communications, or the like. In such examples, synchronization for transmissions may be a prerequisite. Under timing synchronization, UE 115-*a* and UE 115-*c*, for example, may start transmissions and end transmissions on bidirectional communication link 215 and bidirectional communication link 210 at the same time or close to the same time. For instance, UE 115-*a* and UE 115-*c* may communicate via enhanced mobile broadband (eMBB) or a UMTS terrestrial radio access network (UTRAN)-to-UE (Uu) interface, or an interface similar to a Uu interface. In such cases, sidelink UE 115-*a*, for example, may conform to relatively tight (e.g., legacy) timing accuracy requirements. In an illustrative example, a legacy timing error requirement may require the sidelink UE 115-*a* to send uplink transmissions within plus or minus 12 Tera seconds (Ts) for a bandwidth greater than 1.4 megahertz (MHz), or plus or minus 25 Ts for a bandwidth of 1.4 MHz. Conforming to such tight timing accuracy requirements may reduce complexity in determining a fast Fourier Transform (FFT) window at base station 105-*a*. All signals transmitted to base station 105-*a* may arrive within the timing error window due to a timing advance value applied at each transmitting UE 115. Such tight timing error requirements may further allow base station 105-*a* in achieving a good channel estimation and successful demodulation. These achievements may in turn allow for transmissions with a high MCS in wireless communications system 200.

In some examples, sidelink communications (e.g., V2X communications) may utilize a certain synchronization source type (e.g., GNSS, base station, UE, etc.) as a synchronization source. However, tight timing accuracy for sidelink data transmissions may not provide the same level of benefit as other types of wireless communications. In some cases, a sidelink transmission from sidelink UE 115-*a* may not utilize a timing advance. In such examples, a sidelink transmission may arrive at a receiving device within a very large window regardless of transmission timing accuracy. For example, if UE 115-*b* is a larger distance away from sidelink UE 115-*a* than UE 115-*c* is from sidelink UE 115-*a*, then a data transmission to UE 115-*b* from sidelink UE 115-*a* will arrive later than a data transmission to UE 115-*c* from sidelink UE 115-*a*. In some examples, sidelink UE 115-*a* may send a V2X transmission via broadcast. In such cases, sidelink UE 115-*a* may use a relatively low MCS to increase communication range. In such cases, using tight timing accuracy requirements to achieve a relatively high MCS may not be helpful. In some examples, a higher MCS may be used for transmissions within a range determined by a propagation delay. If UE 115-*a* can transmit a sidelink transmission to UE 115-*c* with a propagation delay below a threshold level, then a signal to noise ratio (SNR) may be sufficient to permit UE 115-*c* to demodulate a transmission with a relatively high MCS. However, if the propagation delay is too large, channel estimation error and signal leakage may limit the demodulation performance at UE 115-*c*. Thus, in some cases, where a range is small enough, a relatively high MCS may be used even with a relaxed timing error requirement.

In some cases, sidelink UE 115-*a* may send a sidelink transmission using a relaxed timing error requirement. Sidelink UE 115-*a* may determine that a certain synchronization source type (e.g., GNSS, base station, UE, etc.) is the synchronization source for sidelink transmissions. If a signal of the certain synchronization source type is lost, sidelink UE 115-*a* may continue to track UTC timing by local oscillator. By communicating using a relaxed timing error requirement, UE 115-*a* and other devices in geographic coverage area 110-*a* may increase the duration during which UE 115-*a* may perform local tracking. Selecting a modified timing error requirement and communicating using the modified timing error requirement is described in greater detail with respect to FIG. 3.

Figure 3:
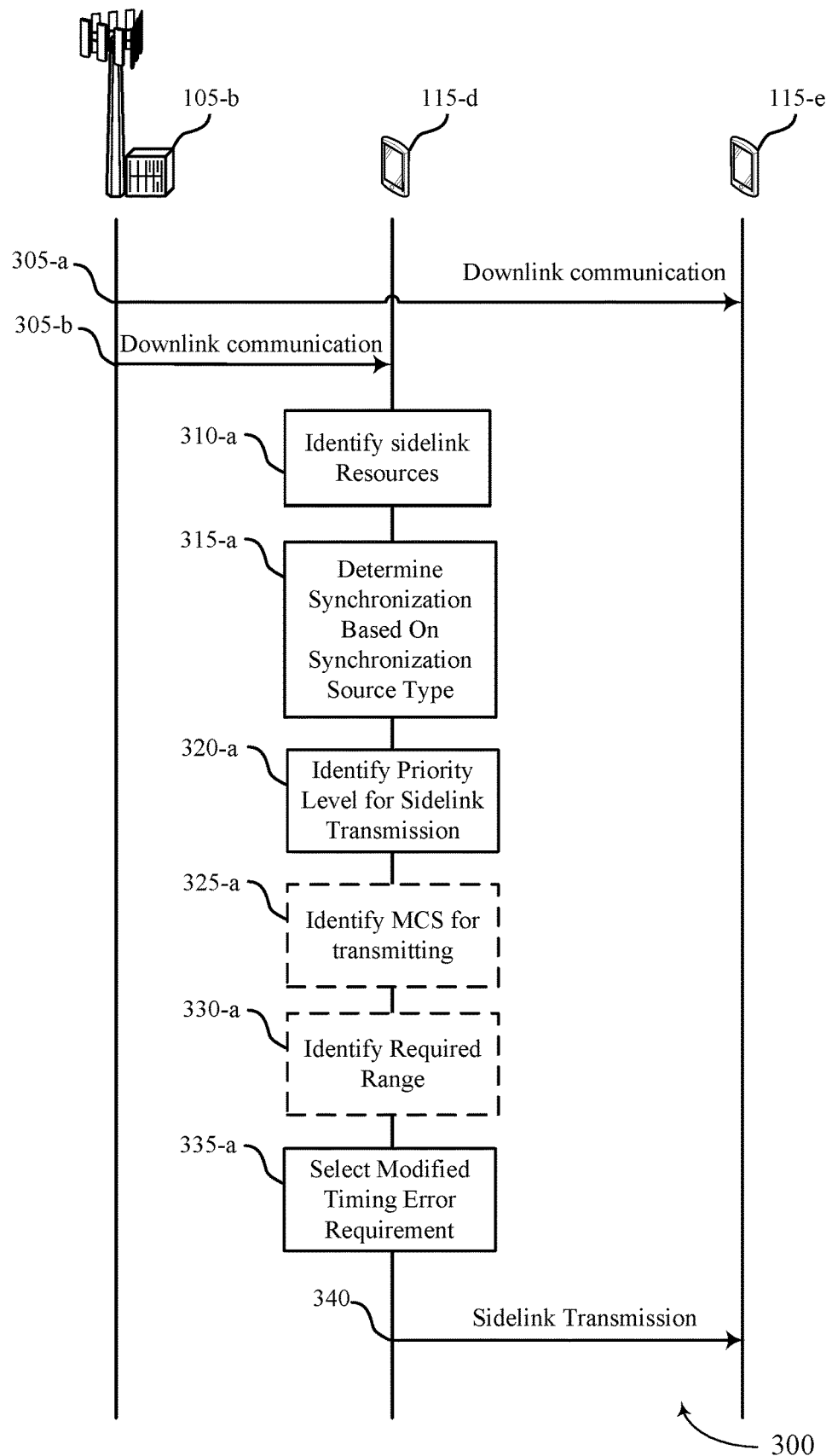
FIG. 3 illustrates an example of a process flow that supports timing accuracy control for V2X sidelink transmission in accordance with aspects of the present disclosure.

FIG. 3 illustrates an example of a process flow 300 that supports timing accuracy control for V2X sidelink transmission in accordance with aspects of the present disclosure. In some examples, process flow 300 may implement aspects of wireless communications system 100. Process flow 300 may be implemented by a base station 105-*b*, a UE 115-*d*, and a UE 115-*e*, which may be examples of corresponding devices in wireless communications system 100 and wireless communications system 200.

In some examples, base station 105-*b* may communicate with one or more UEs 115 (e.g., UE 115-*d* and UE 115-*e*). In some examples, at least one of UE 115-*d* and UE 115-*e* may be configured as a sidelink UE. In some cases, at least one of UEs 115 may be vehicles. In some cases, at least one of UE 115-*d* and UE 115-*e* may be integrated with a vehicle. In some cases, UEs 115-*d* and/or 115-*e* may be examples of a UE 115 described with reference to FIG. 1 (e.g. a phone, laptop, vehicle, etc.), and may be configured for V2X communication over one or more carriers (e.g., using ProSe direct communications). In some cases, a communications manager at each UE 115 may manage V2X communications and associated IDs used in the V2X communications. One or more devices (e.g., base station 105-*b*, UE 115-*d*, or UE 115-*e*) may communicate using modified timing error requirements.

At 305-*a* and 305-*b*, base station 105-*b* may send a downlink communication to UE 115-*d* and UE 115-*e*, indicating resources for sidelink communication. At 310-*a* and 310-*b*, UE 115-*d* and UE 115-*e*, respectively, may identify sidelink resources based on the downlink communication. In some examples, the downlink communication (or other downlink signaling from base station 105-*b*) may include an indication of one or more timing error requirement values. For instance, the one or more timing error requirements may include a legacy timing error requirement and a modified (e.g., relaxed) timing error requirement. In some cases, UE 115-*d* or UE 115-*e*, or both, may identify resources for sidelink communication (e.g., independent of or separate from a downlink communication from base station 105-*b*). In some cases, UE 115-*d* or UE 115-*e*, or both, may autonomously select resources for sidelink communication.

In some examples, the one or more timing error requirements may include a set of timing error requirements (e.g., a first timing error requirement, a second timing error requirement that is larger than the first timing error requirement, a third timing error requirement that is larger than the second timing error requirement, etc.). UE 115-*d* and UE 115-*e* may select one of the timing error requirements from the set of one or more timing error requirements as described in greater detail herein. In some examples, UE 115-*d* and UE 115-*e* may be preconfigured with the one or more timing error requirements. In some examples a downlink message may include a lookup table indicating MCS values that correspond to timing error requirements. In some examples, UE 115-*d* and UE 115-*e* may select a timing error requirement from the set of one or more timing error requirements as described in greater detail herein. In some examples, UE 115-*d* and UE 115-*e* may be preconfigured with the one or more timing error requirements. In some examples a downlink message may include a lookup table indicating MCS values that correspond to timing error requirements. In some examples, UE 115-*d* and UE 115-*e* may be preconfigured with the lookup table.

At 315-*a* and 315-*b*, UE 115-*d* and UE 115-*e* may determine that synchronization for wireless communications is based on a synchronization source type (e.g., global navigation satellite system (GNSS), base station, user equipment (UE), etc.).

At 320-*a*, UE 115-*d* may determine a priority level for a sidelink transmission to be transmitted at 340. In some examples, UE 115-*e* may determine the priority level for the sidelink transmission at 320-*b*. In some examples, UE 115-*e* may receive a sidelink transmission at 340, and may subsequently determine the priority level for the sidelink transmission.

UE 115-*d* may be configured to determine a priority level for each packet of a sidelink data transmission. Different types of data transmissions may be one of two priority groups (e.g., high priority and low priority) or may be one of many priority levels (e.g., priority level 1, priority level 2, priority level 3, etc.). For instance, traffic safety sensor data (e.g., an indication that brakes on a vehicle do not function, an indication that a driver has applied the brakes in an unpredictable or sudden manner, an indication that an accident has occurred at a particular location, or an indication that any part of a vehicle is malfunctioning) may be identified as high priority messages. Current travel status data (e.g., an indication of current speed, current bearing, or the like for a particular vehicle) may be low priority data. In an illustrative example, an indication that brakes are not functioning may have a highest level priority (e.g., priority level 3), an indication that a crash has occurred at a particular location may have a high priority (e.g., a priority level 2), an indication that brake lights are not functioning may have a low priority (e.g., a priority level 1) and an indication of current travel status data may have a lowest priority level (priority level 0).

In some examples, identifying a priority level for a sidelink transmission at 320-*a* may include determining whether a sidelink transmission at 340 is high priority or low priority. A message having a high priority may qualify for transmission using a relaxed timing error requirement, while a message having a low priority may be sent using a legacy or heightened timing error requirement. In some examples, identifying a priority level for a sidelink transmission at 320-*a* may include determining whether a priority level for a sidelink transmission exceeds a threshold. For instance, a threshold priority level may be equal to 2. In such examples, a message having priority level 2 or above may qualify for transmission using a relaxed timing error requirement, while a message having priority level 1 or 0 may be sent using a legacy or heightened timing error requirement. In some examples, UE 115-*d* may select a modified timing error requirement (e.g., a relaxed timing error requirement) at 335-*a* when synchronization is based on a certain synchronization source type (e.g., GNSS, base station, UE, etc.) and the identified priority level is sufficiently high or exceeds a threshold.

At 325-*a*, UE 115-*d* may identify an MCS for transmission the sidelink transmission at 340. In some examples, the MCS may be selected based on the priority level. For instance, a high priority level or a priority level that exceeds a threshold priority level may be transmitted using a low MCS to ensure reception.

In some examples, UE 115-*d* may select a modified timing error requirement based at least in part on a selected MCS. In one illustrative example, UE 115-*d* may apply the identified MCS value to a lookup table, and may identify a timing error requirement based on the MCS value. For instance, as described above, UE 115-*d* may select a high MCS for a high priority transmission. The lookup table may indicate that for the high MCS value, the sidelink transmission should be transmitted with a relaxed timing error requirement. In some examples, the lookup table may indicate multiple relaxed timing error levels. For instance, for a medium MCS value, a relaxed timing error requirement may be used to send the transmission, and for a low MCS value, a more relaxed timing error requirement may be used to send the transmission. Alternatively, if the MCS level is high, a legacy or less relaxed timing error requirement may be used to send the transmission.

In another illustrative example, UE 115-*d* may configure an MCS threshold value. For instance, the MCS threshold value may be equal to 3. If an MCS value of 3 or lower is used, UE 115-*d* may send the sidelink transmission at 340 using a relaxed timing error requirement. If the MCS value higher than 3 is used, UE 115-*d* may send the sidelink transmission at 340 with a tight or legacy timing error requirement. In such examples, UE 115-*d* may select one of two timing error requirements (e.g., a legacy timing error requirement or a modified timing error requirement) for sending the sidelink transmission.

At 330-*a*, UE 115-*d* may identify a required range for sending a sidelink transmission at 340. In some examples, UE 115-*d* may set a transmission power based on the required range. For instance if UE 115-*e* is located relatively far away from UE 115-*d*, then UE 115-*d* may set a higher transmission power than if UE 115-*e* is located relatively close to UE 115-*d*. In some cases, UE 115-*d* may determine a propagation range corresponding to the required range, and may set the transmission power based thereon. If the transmission power is set low enough (e.g., if UE 115-*e* is located close enough to UE 115-*d*) then the signal will only be received by UEs within the determined required range. In such examples, UE 115-*d* may transmit with a higher MCS. UE 115-*d* may select the relaxed timing error requirement based on the selected low transmit power. Accordingly, despite the lower transmission power the sidelink transmission may still be received by UE 115-*e* and UE 115-*e* may still successfully decode the selected MCS with the propagation delay and the relaxed timing error requirement.

At 340, UE 115-*d* may send UE 115-*d* to UE 115-*e* using the selected timing error requirement. UE 115-*d* may receive the sidelink transmission sent using the selected timing error requirement.

Figure 4:
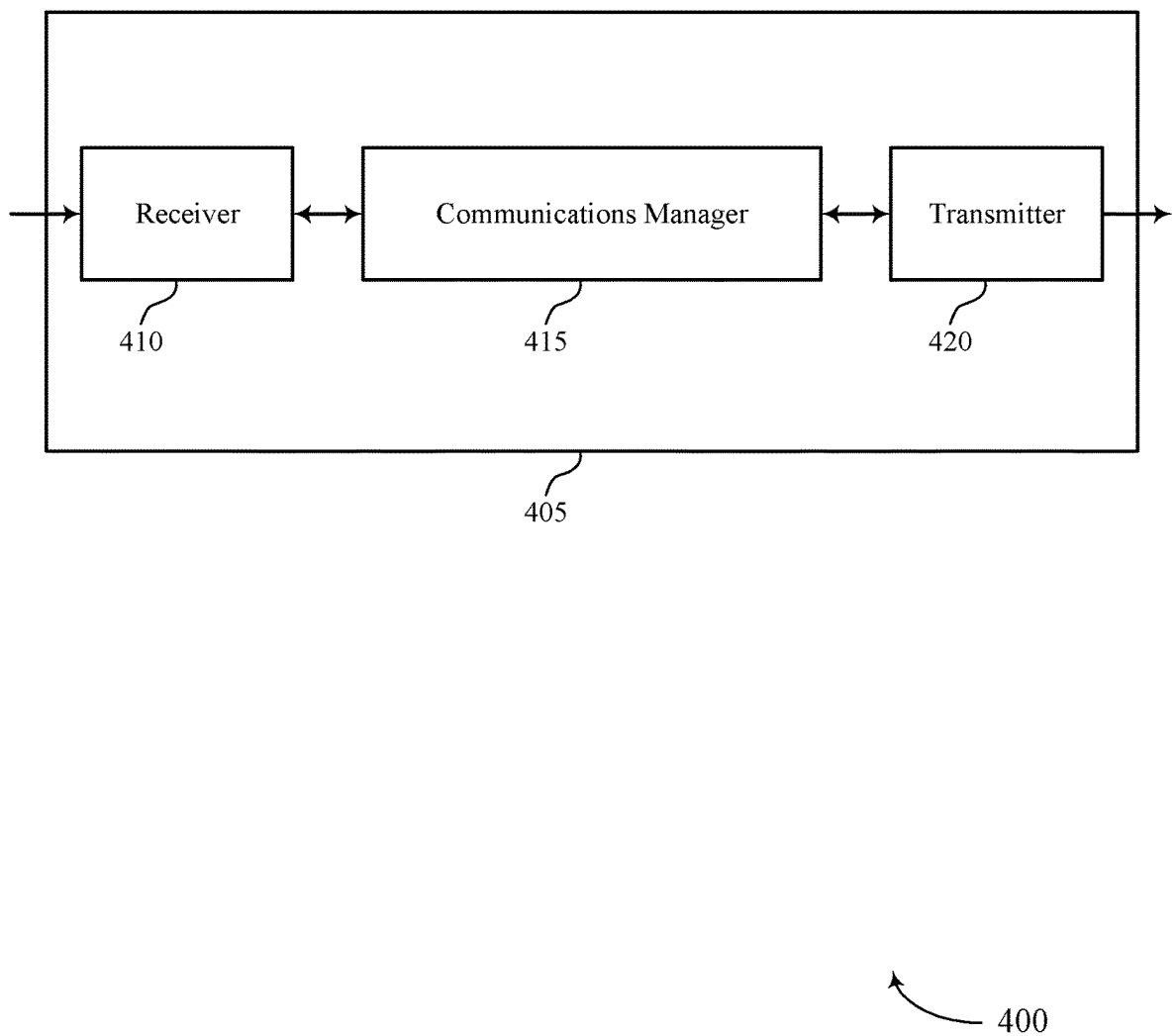
FIGS. 4 and 5 show block diagrams of devices that support timing accuracy control for V2X sidelink transmission in accordance with aspects of the present disclosure.

FIG. 4 shows a block diagram 400 of a device 405 that supports timing accuracy control for V2X sidelink transmission in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to timing accuracy control for V2X sidelink transmission, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine that synchronization for sidelink communication is based on a synchronization source type (e.g., global navigation satellite system (GNSS), base station, user equipment (UE), etc.), identify a priority level for a sidelink transmission, select a modified timing error requirement for the sidelink transmission based on the determining and the identifying, and send the sidelink transmission using the modified timing error requirement. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
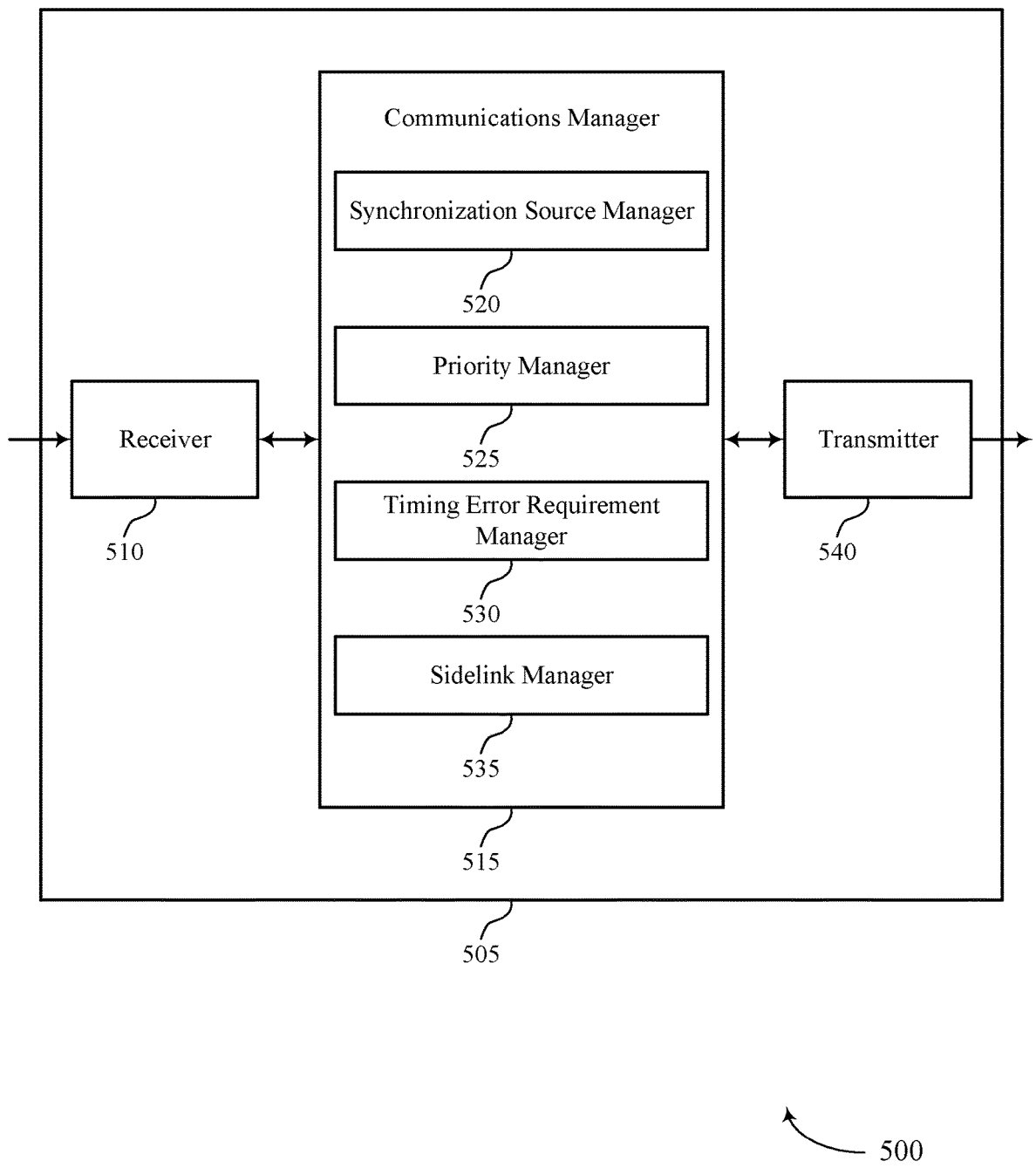

FIG. 5 shows a block diagram 500 of a device 505 that supports timing accuracy control for V2X sidelink transmission in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to timing accuracy control for V2X sidelink transmission, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a synchronization source manager 520, a priority manager 525, a timing error requirement manager 530, and a sidelink manager 535. The communications manager 515 may be an example of aspects of the communications manager 710 described herein.

The synchronization source manager 520 may determine that synchronization for sidelink communication is based on a synchronization source type (e.g., global navigation satellite system (GNSS), base station, user equipment (UE), etc.). The priority manager 525 may identify a priority level for a sidelink transmission. The timing error requirement manager 530 may select a modified timing error requirement for the sidelink transmission based on the determining and the identifying. The sidelink manager 535 may send the sidelink transmission using the modified timing error requirement.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
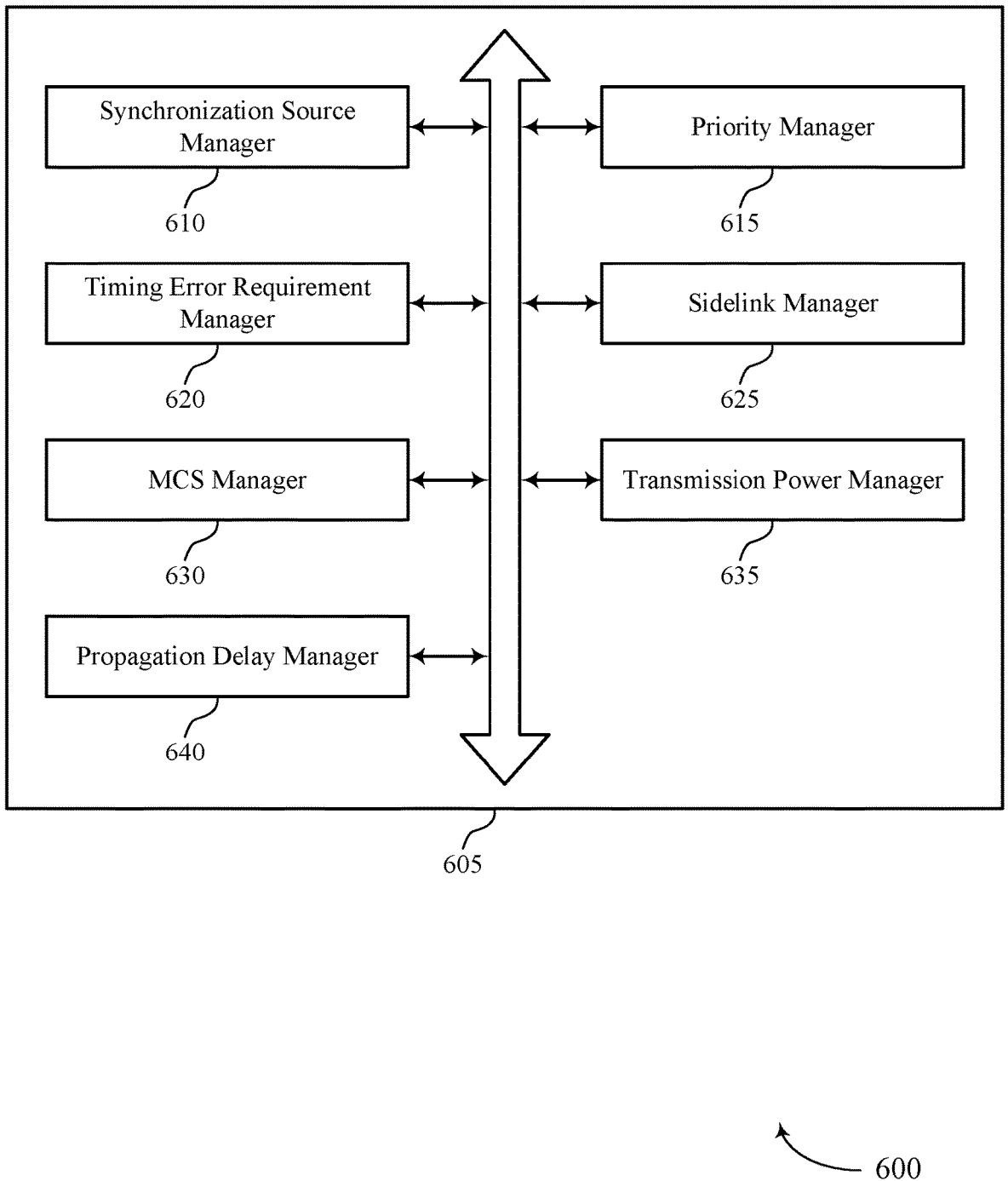
FIG. 6 shows a block diagram of a communications manager that supports timing accuracy control for V2X sidelink transmission in accordance with aspects of the present disclosure.

FIG. 6 shows a block diagram 600 of a communications manager 605 that supports timing accuracy control for V2X sidelink transmission in accordance with aspects of the present disclosure. The communications manager 605 may be an example of aspects of a communications manager 415, a communications manager 515, or a communications manager 710 described herein. The communications manager 605 may include a synchronization source manager 610, a priority manager 615, a timing error requirement manager 620, a sidelink manager 625, a MCS manager 630, a transmission power manager 635, and a propagation delay manager 640. Each of these modules may communicate, directly or indirectly, with one another (e.g., via one or more buses).

The synchronization source manager 610 may determine that synchronization for sidelink communication is based on a synchronization source type (e.g., global navigation satellite system (GNSS), base station, user equipment (UE), etc.). The priority manager 615 may identify a priority level for a sidelink transmission.

The timing error requirement manager 620 may select a modified timing error requirement for the sidelink transmission based on the determining and the identifying. In some examples, the timing error requirement manager 620 may receive an indication of one or more modified timing error requirement values from a network device; where selecting the modified timing error requirement is based on the indication. In some examples, the timing error requirement manager 620 may identify one or more preconfigured modified timing error requirement values, where selecting the modified timing error requirement is based on the one or more preconfigured modified timing error requirement values.

The sidelink manager 625 may send the sidelink transmission using the modified timing error requirement.

The MCS manager 630 may identify an MCS for transmitting the sidelink transmission, where selecting the modified timing error requirement for the sidelink transmission is based on the identified MCS. In some examples, the MCS manager 630 may apply the identified MCS to a lookup table. In some examples, the MCS manager 630 may identify an entry in the lookup table indicating a timing error requirement corresponding to the identified MCS, where selecting the modified timing error requirement is based on the identified entry in the lookup table. In some examples, the MCS manager 630 may determine an MCS threshold value. In some examples, the MCS manager 630 may compare the identified MCS to the MCS threshold value to determine whether the identified MCS exceeds the MCS threshold value, where selecting the modified timing error requirement is based on the comparing. In some examples, the MCS manager 630 may identify the MCS is based on the identified priority level.

The transmission power manager 635 may identify a required range for transmitting the sidelink transmission. In some examples, the transmission power manager 635 may set a transmission power for sending the sidelink transmission based on the identified required range, where selecting the modified timing error requirement is based on the required range and the transmission power.

The propagation delay manager 640 may identify a propagation delay corresponding to the identified required range for transmitting the sidelink transmission, where setting the transmission power for sending the sidelink transmission is based on the identified propagation delay.

Figure 7:
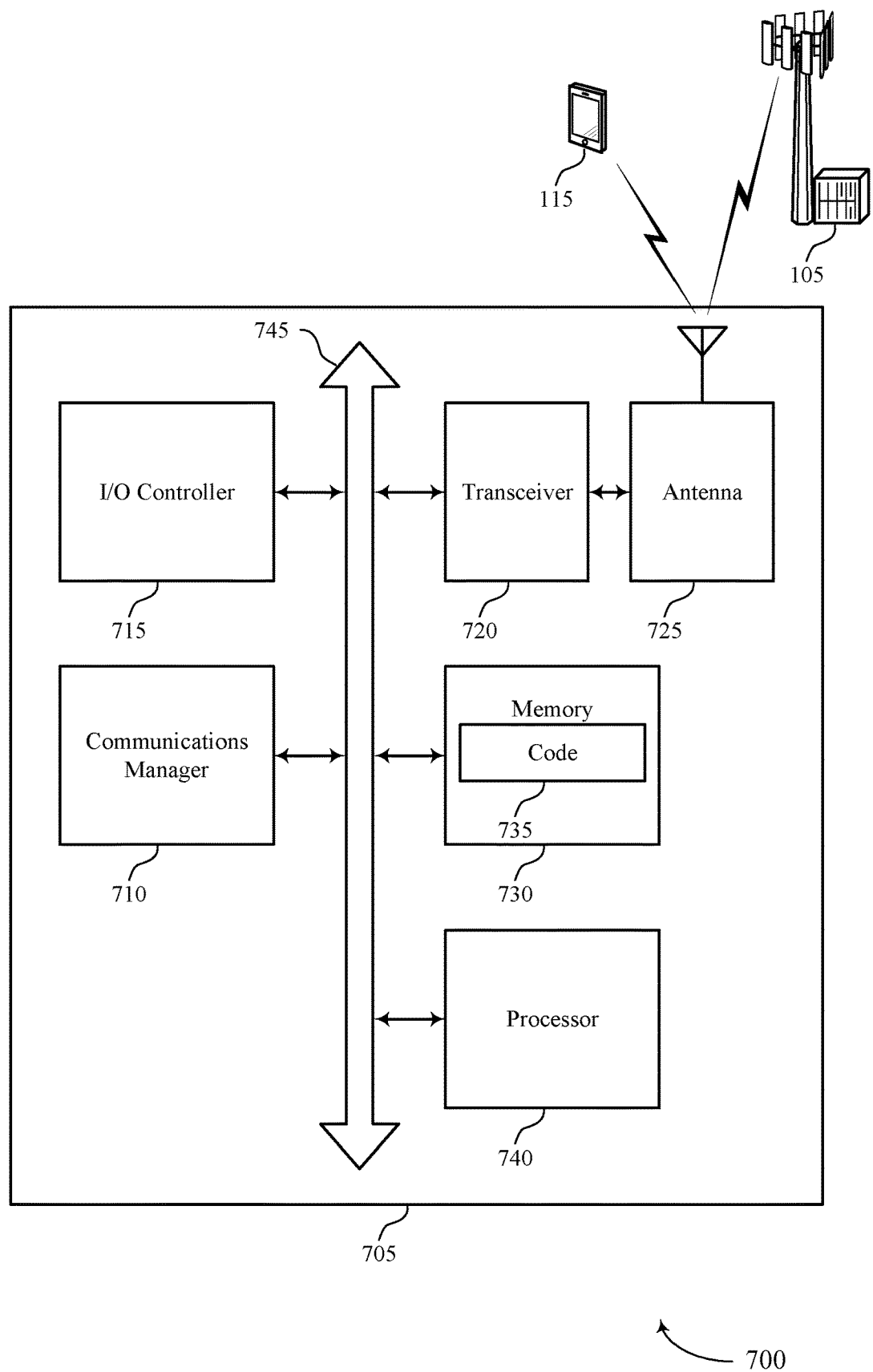
FIG. 7 shows a diagram of a system including a device that supports timing accuracy control for V2X sidelink transmission in accordance with aspects of the present disclosure.

FIG. 7 shows a diagram of a system 700 including a device 705 that supports timing accuracy control for V2X sidelink transmission in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine that synchronization for sidelink communication is based on a synchronization source type (e.g., global navigation satellite system (GNSS), base station, user equipment (UE), etc.), identify a priority level for a sidelink transmission, select a modified timing error requirement for the sidelink transmission based on the determining and the identifying, and send the sidelink transmission using the modified timing error requirement.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting timing accuracy control for V2X sidelink transmission).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
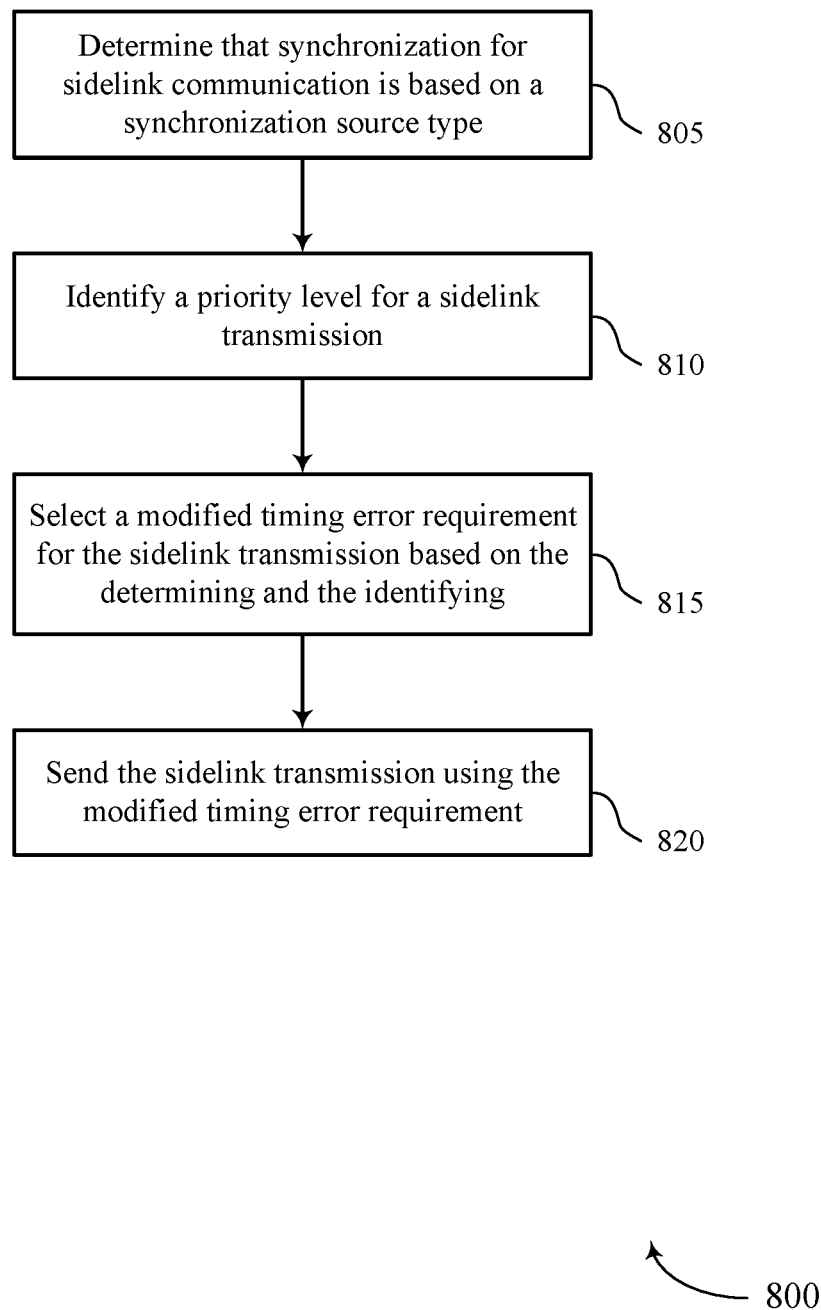
FIGS. 8 through 10 show flowcharts illustrating methods that support timing accuracy control for V2X sidelink transmission in accordance with aspects of the present disclosure.

FIG. 8 shows a flowchart illustrating a method 800 that supports timing accuracy control for V2X sidelink transmission in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may determine that synchronization for sidelink communication is based on a synchronization source type (e.g., global navigation satellite system (GNSS), base station, user equipment (UE), etc.). The operations of 805 may be performed according to the methods described herein. In some examples, aspects of the operations of 805 may be performed by a synchronization source manager as described with reference to FIGS. 4 through 7.

At 810, the UE may identify a priority level for a sidelink transmission. The operations of 810 may be performed according to the methods described herein. In some examples, aspects of the operations of 810 may be performed by a priority manager as described with reference to FIGS. 4 through 7.

At 815, the UE may select a modified timing error requirement for the sidelink transmission based on the determining and the identifying. The operations of 815 may be performed according to the methods described herein. In some examples, aspects of the operations of 815 may be performed by a timing error requirement manager as described with reference to FIGS. 4 through 7.

At 820, the UE may send the sidelink transmission using the modified timing error requirement. The operations of 820 may be performed according to the methods described herein. In some examples, aspects of the operations of 820 may be performed by a sidelink manager as described with reference to FIGS. 4 through 7.

Figure 9:
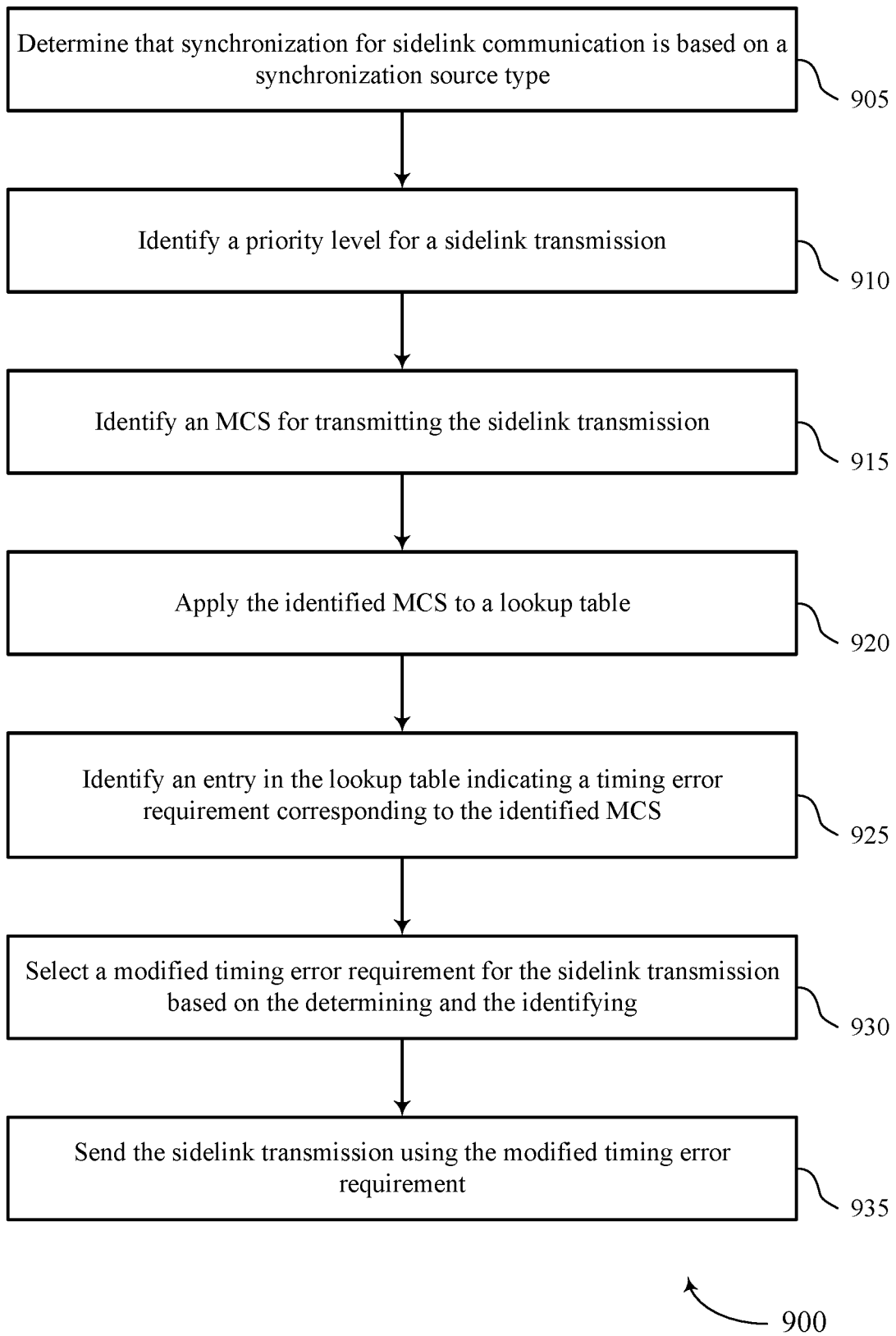

FIG. 9 shows a flowchart illustrating a method 900 that supports timing accuracy control for V2X sidelink transmission in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may determine that synchronization for sidelink communication is based on a synchronization source type (e.g., global navigation satellite system (GNSS), base station, user equipment (UE), etc.). The operations of 905 may be performed according to the methods described herein. In some examples, aspects of the operations of 905 may be performed by a synchronization source manager as described with reference to FIGS. 4 through 7.

At 910, the UE may identify a priority level for a sidelink transmission. The operations of 910 may be performed according to the methods described herein. In some examples, aspects of the operations of 910 may be performed by a priority manager as described with reference to FIGS. 4 through 7.

At 915, the UE may identify an MCS for transmitting the sidelink transmission. The operations of 915 may be performed according to the methods described herein. In some examples, aspects of the operations of 915 may be performed by a MCS manager as described with reference to FIGS. 4 through 7.

At 920, the UE may apply the identified MCS to a lookup table. The operations of 920 may be performed according to the methods described herein. In some examples, aspects of the operations of 920 may be performed by a MCS manager as described with reference to FIGS. 4 through 7.

At 925, the UE may identify an entry in the lookup table indicating a timing error requirement corresponding to the identified MCS. The operations of 925 may be performed according to the methods described herein. In some examples, aspects of the operations of 925 may be performed by a MCS manager as described with reference to FIGS. 4 through 7.

At 930, the UE may select a modified timing error requirement for the sidelink transmission based on the determining and the identifying. Selecting the modified timing error requirement for the sidelink transmission may be based on the identified MCS. Selecting the modified timing error requirement is based on the identified entry in the lookup table The operations of 930 may be performed according to the methods described herein. In some examples, aspects of the operations of 930 may be performed by a timing error requirement manager as described with reference to FIGS. 4 through 7.

At 935, the UE may send the sidelink transmission using the modified timing error requirement. The operations of 935 may be performed according to the methods described herein. In some examples, aspects of the operations of 935 may be performed by a sidelink manager as described with reference to FIGS. 4 through 7.

Figure 10:
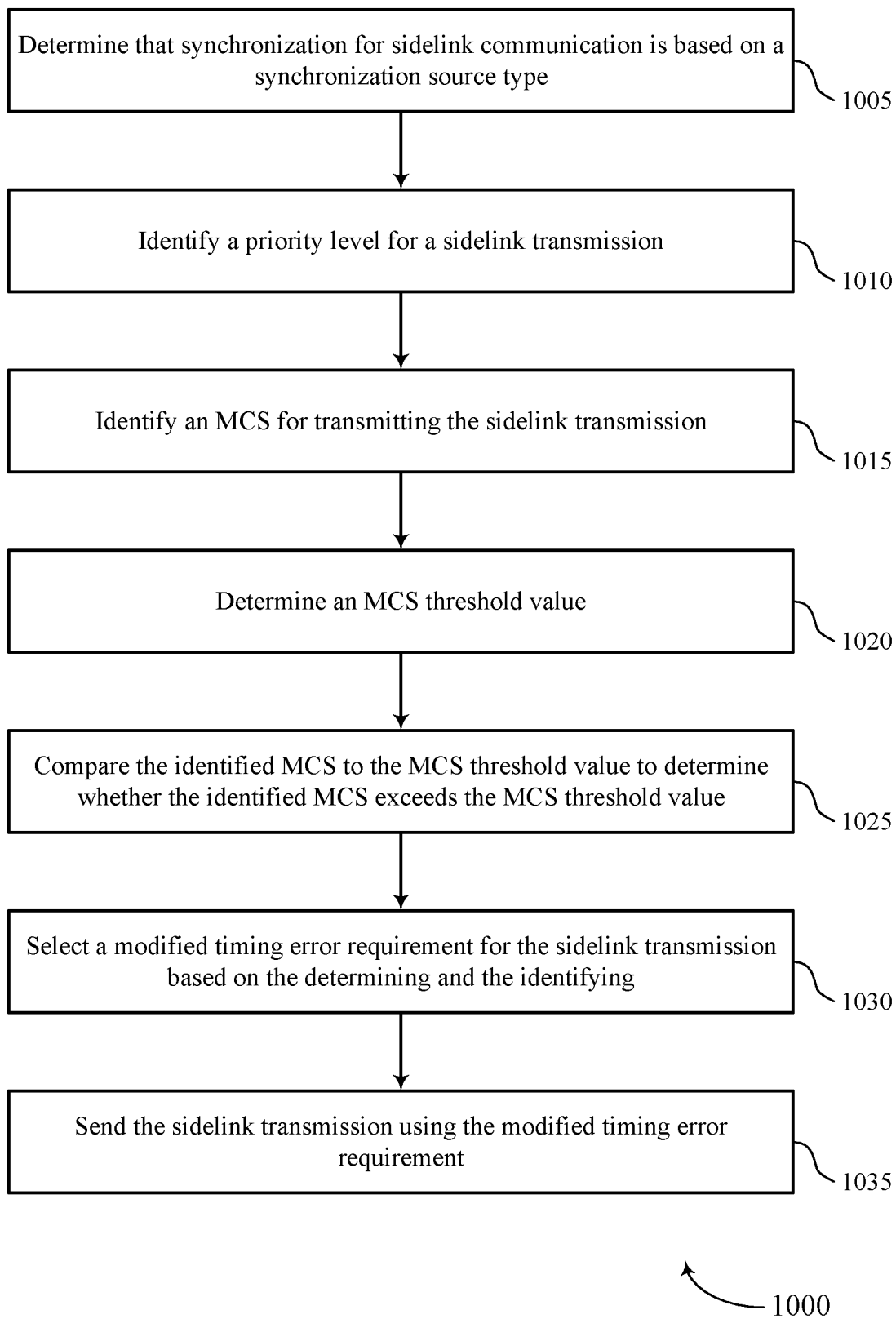

FIG. 10 shows a flowchart illustrating a method 1000 that supports timing accuracy control for V2X sidelink transmission in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may determine that synchronization for sidelink communication is based on a synchronization source type (e.g., global navigation satellite system (GNSS), base station, user equipment (UE), etc.). The operations of 1005 may be performed according to the methods described herein. In some examples, aspects of the operations of 1005 may be performed by a synchronization source manager as described with reference to FIGS. 4 through 7.

At 1010, the UE may identify a priority level for a sidelink transmission. The operations of 1010 may be performed according to the methods described herein. In some examples, aspects of the operations of 1010 may be performed by a priority manager as described with reference to FIGS. 4 through 7.

At 1015, the UE may identify an MCS for transmitting the sidelink transmission. The operations of 1015 may be performed according to the methods described herein. In some examples, aspects of the operations of 1015 may be performed by a MCS manager as described with reference to FIGS. 4 through 7.

At 1020, the UE may determine an MCS threshold value. The operations of 1020 may be performed according to the methods described herein. In some examples, aspects of the operations of 1020 may be performed by a MCS manager as described with reference to FIGS. 4 through 7.

At 1025, the UE may compare the identified MCS to the MCS threshold value to determine whether the identified MCS exceeds the MCS threshold value. The operations of 1025 may be performed according to the methods described herein. In some examples, aspects of the operations of 1025 may be performed by a MCS manager as described with reference to FIGS. 4 through 7.

At 1030, the UE may select a modified timing error requirement for the sidelink transmission based on the determining and the identifying. Selecting the modified timing error requirement for the sidelink transmission may be based on the identified MCS. Selecting the modified timing error requirement is based on the comparing The operations of 1030 may be performed according to the methods described herein. In some examples, aspects of the operations of 1030 may be performed by a timing error requirement manager as described with reference to FIGS. 4 through 7.

At 1035, the UE may send the sidelink transmission using the modified timing error requirement. The operations of 1035 may be performed according to the methods described herein. In some examples, aspects of the operations of 1035 may be performed by a sidelink manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining that synchronization for sidelink communication is based at least in part on a synchronization source type;
   identifying a priority level of a sidelink transmission;
   selecting a modified timing error requirement for the sidelink transmission based at least in part on the determining and the identifying, and a modulation and coding scheme for transmitting the sidelink transmission; and
   transmitting the sidelink transmission according to the modulation and coding scheme using the modified timing error requirement.

2. The method of claim 1, further comprising:
   applying the identified modulation and coding scheme to a lookup table; and
   identifying an entry in the lookup table indicating a timing error requirement corresponding to the identified modulation and coding scheme, wherein selecting the modified timing error requirement is based at least in part on the identified entry in the lookup table.

3. The method of claim 1, further comprising:
   determining a modulation and coding scheme threshold value; and
   comparing the identified modulation and coding scheme to the modulation and coding scheme threshold value to determine whether the identified modulation and coding scheme exceeds the modulation and coding scheme threshold value, wherein selecting the modified timing error requirement is based at least in part on the comparing.

4. The method of claim 1, wherein:
   identifying the modulation and coding scheme is based at least in part on the identified priority level.

5. The method of claim 1, further comprising:
   receiving an indication of one or more modified timing error requirement values from a network device, wherein selecting the modified timing error requirement is based at least in part on the indication.

6. The method of claim 1, further comprising:
   identifying one or more preconfigured modified timing error requirement values, wherein selecting the modified timing error requirement is based at least in part on the one or more preconfigured modified timing error requirement values.

7. The method of claim 1, further comprising:
   identifying a required range for transmitting the sidelink transmission; and
   setting a transmission power for sending the sidelink transmission based at least in part on the identified required range, wherein selecting the modified timing error requirement is based at least in part on the required range and the transmission power.

8. The method of claim 7, further comprising:
   identifying a propagation delay corresponding to the identified required range for transmitting the sidelink transmission, wherein setting the transmission power for sending the sidelink transmission is based at least in part on the identified propagation delay or the modified timing error requirement, or both.

9. The method of claim 1, wherein the synchronization source type includes at least one of a global navigation satellite system, or a base station, or a user equipment, or any combination thereof.

10. An apparatus for wireless communication, comprising: a processor, memory in electronic communication with the processor; and instructions stored in the memory and executable by the processor to cause the apparatus to:
    determine that synchronization for sidelink communication is based at least in part on a synchronization source type;
    identify a priority level of a sidelink transmission;
    select a modified timing error requirement for the sidelink transmission based at least in part on the determining and the identifying, and a modulation and coding scheme for transmitting the sidelink transmission; and
    transmit the sidelink transmission according to the modulation and coding scheme using the modified timing error requirement.

11. The apparatus of claim 10, wherein the instructions are further executable by the processor to cause the apparatus to:
    apply the identified modulation and coding scheme to a lookup table; and identify an entry in the lookup table indicating a timing error requirement corresponding to the identified modulation and coding scheme, wherein selecting the modified timing error requirement is based at least in part on the identified entry in the lookup table.

12. The apparatus of claim 10, wherein the instructions are further executable by the processor to cause the apparatus to:
determine a modulation and coding scheme threshold value; and
compare the identified modulation and coding scheme to the modulation and coding scheme threshold value to determine whether the identified modulation and coding scheme exceeds the modulation and coding scheme threshold value, wherein selecting the modified timing error requirement is based at least in part on the comparing.

13. The apparatus of claim 10, wherein identifying the modulation and coding scheme is based at least in part on the identified priority level.

14. The apparatus of claim 10, wherein the instructions are further executable by the processor to cause the apparatus to:
receive an indication of one or more modified timing error requirement values from a network device, wherein selecting the modified timing error requirement is based at least in part on the indication.

15. The apparatus of claim 10, wherein the instructions are further executable by the processor to cause the apparatus to:
identify one or more preconfigured modified timing error requirement values, wherein selecting the modified timing error requirement is based at least in part on the one or more preconfigured modified timing error requirement values.

16. The apparatus of claim 10, wherein the instructions are further executable by the processor to cause the apparatus to:
identify a required range for transmitting the sidelink transmission; and
set a transmission power for sending the sidelink transmission based at least in part on the identified required range, wherein selecting the modified timing error requirement is based at least in part on the required range and the transmission power.

17. The apparatus of claim 16, wherein the instructions are further executable by the processor to cause the apparatus to:
identify a propagation delay corresponding to the identified required range for transmitting the sidelink transmission, wherein setting the transmission power for sending the sidelink transmission is based at least in part on the identified propagation delay or the modified timing error requirement, or both.

18. An apparatus for wireless communication, comprising:
means for determining that synchronization for sidelink communication is based at least in part on a synchronization source type;
means for identifying a priority level of a sidelink transmission;
means for selecting a modified timing error requirement for the sidelink transmission based at least in part on the determining and the identifying, and a modulation and coding scheme for transmitting the sidelink transmission; and
means for transmitting the sidelink transmission according to the modulation and coding scheme using the modified timing error requirement.

19. The apparatus of claim 18, further comprising:
means for applying the identified modulation and coding scheme to a lookup table; and
means for identifying an entry in the lookup table indicating a timing error requirement corresponding to the identified modulation and coding scheme, wherein selecting the modified timing error requirement is based at least in part on the identified entry in the lookup table.

20. The apparatus of claim 18, further comprising:
means for determining a modulation and coding scheme threshold value; and
means for comparing the identified modulation and coding scheme to the modulation and coding scheme threshold value to determine whether the identified modulation and coding scheme exceeds the modulation and coding scheme threshold value, wherein selecting the modified timing error requirement is based at least in part on the comparing.

21. The apparatus of claim 18, wherein identifying the modulation and coding scheme is based at least in part on the identified priority level.

22. The apparatus of claim 18, further comprising:
means for receiving an indication of one or more modified timing error requirement values from a network device, wherein selecting the modified timing error requirement is based at least in part on the indication.

23. The apparatus of claim 18, further comprising:
means for identifying one or more preconfigured modified timing error requirement values, wherein selecting the modified timing error requirement is based at least in part on the one or more preconfigured modified timing error requirement values.

24. The apparatus of claim 18, further comprising:
means for identifying a required range for transmitting the sidelink transmission; and
means for setting a transmission power for sending the sidelink transmission based at least in part on the identified required range, wherein selecting the modified timing error requirement is based at least in part on the required range and the transmission power.

25. The apparatus of claim 24, further comprising:
means for identifying a propagation delay corresponding to the identified required range for transmitting the sidelink transmission, wherein setting the transmission power for sending the sidelink transmission is based at least in part on the identified propagation delay or the modified timing error requirement, or both.

26. A non-transitory computer-readable medium storing code for wireless communication, the code comprising instructions executable by a processor to:
determine that synchronization for sidelink communication is based at least in part on a synchronization source type;
identify a priority level of a sidelink transmission;
select a modified timing error requirement for the sidelink transmission based at least in part on the determining and the identifying, and a modulation and coding scheme for transmitting the sidelink transmission; and
transmit the sidelink transmission according to the modulation and coding scheme using the modified timing error requirement.

* * * * *